(12) United States Patent
Glynn

(10) Patent No.: US 11,150,033 B2
(45) Date of Patent: Oct. 19, 2021

(54) APPARATUS AND METHODS FOR ENERGY STORAGE AND RETRIEVAL

(71) Applicant: Patrick Joseph Glynn, Kuraby (AU)

(72) Inventor: Patrick Joseph Glynn, Kuraby (AU)

(73) Assignee: Dr. Patrick Joseph Glynn, Kuraby (AU)

( * ) Notice: Subject to any disclaimer, the term of this patent is extended or adjusted under 35 U.S.C. 154(b) by 105 days.

(21) Appl. No.: 16/477,195

(22) PCT Filed: Dec. 7, 2017

(86) PCT No.: PCT/IB2017/057713
§ 371 (c)(1),
(2) Date: Jul. 11, 2019

(87) PCT Pub. No.: WO2018/104896
PCT Pub. Date: Jun. 14, 2018

(65) Prior Publication Data
US 2020/0340759 A1 Oct. 29, 2020

(30) Foreign Application Priority Data
Dec. 8, 2016 (IN) .............................. 201641041973

(51) Int. Cl.
*F28D 20/02* (2006.01)
*C09K 5/06* (2006.01)
(Continued)

(52) U.S. Cl.
CPC .............. *F28D 20/02* (2013.01); *C09K 5/063* (2013.01); *F28D 21/00* (2013.01); *F28F 21/02* (2013.01);
(Continued)

(58) Field of Classification Search
CPC ...... F24S 60/10; Y02E 60/14; F28D 20/0056; F28D 20/02–028
See application file for complete search history.

(56) References Cited

U.S. PATENT DOCUMENTS

| | | | |
|---|---|---|---|
| 4,192,144 A * | 3/1980 | Pierce | F28D 20/023 60/641.8 |
| 2011/0289924 A1* | 12/2011 | Pietsch | F28D 20/0056 60/682 |
| 2012/0222415 A1* | 9/2012 | Glynn | F03G 6/068 60/516 |

FOREIGN PATENT DOCUMENTS

| | | | | |
|---|---|---|---|---|
| DE | 102009059090 A1 * | 6/2011 | | F28D 15/00 |
| JP | H05106979 A * | 4/1993 | | |

(Continued)

*Primary Examiner* — Laert Dounis
(74) *Attorney, Agent, or Firm* — Patrick Joseph Glynn

(57) ABSTRACT

The apparatus for storing and retrieving thermal energy by employing a phase change material (PCM) comprises thermally conductive units, energy sources for providing thermal energy to PCM, an inert gas system, insulation layers and outer enclosure member. The conductive unit has trench (es) for holding the PCM. The trench has opposing significantly curved longitudinal walls and side walls meeting at a base thereby having a greater internal pressure withstanding capacity. In some embodiments, the conductive units are configured to maximise the volume ratio of the PCM to conductive material. In one embodiment, the trench is partially elliptical in a planar cross section that is perpendicular to a major axis or a minor axis of the trench. The apparatus is in thermal contact with thermal energy conversion system for transferring retrieved thermal energy to thermal energy conversion system that converts retrieved thermal energy into electrical energy.

16 Claims, 20 Drawing Sheets

(51) Int. Cl.
*F28D 21/00* (2006.01)
*F28F 21/02* (2006.01)

(52) U.S. Cl.
CPC .. *F28D 2021/0026* (2013.01); *F28F 2265/12* (2013.01); *F28F 2265/16* (2013.01); *Y02E 60/14* (2013.01)

(56) References Cited

FOREIGN PATENT DOCUMENTS

| | | | | | |
|---|---|---|---|---|---|
| JP | H10220828 | A | * | 8/1998 | |
| JP | H1144494 | A | * | 2/1999 | |
| KR | 20120069926 | A | * | 6/2012 | |
| WO | WO-2012097861 | A1 | * | 7/2012 | ........... F28D 20/021 |
| WO | WO-2017029463 | A1 | * | 2/2017 | ........... F28D 20/026 |
| WO | WO-2017173499 | A1 | * | 10/2017 | ........... F28D 20/021 |
| WO | WO-2018201193 | A1 | * | 11/2018 | ........... F28D 20/023 |

\* cited by examiner

APPARATUS AND METHODS FOR ENERGY STORAGE AND RETRIEVAL

TECHNICAL FIELD

The present disclosure generally relates to the field of thermal energy storage. More particularly, the present disclosure relates to apparatus and methods for thermal energy storage and retrieval by using a phase change material.

BACKGROUND

Solar energy and wind energy are some of the renewable energy resources that serve as a welcome alternative to the environmentally polluting non-renewable energy resources. Solar and wind energy are intermittent energy sources. Normalisation of such power generation is possible by integrating energy storage solutions with such energy sources. At present, energy could be stored via compressed air storage, pumped hydro storage, hydrogen energy storage or batteries. But the road blocks for commercial scale energy storage have been attributed to the energy density, efficiency and the high costs. A cost effective solution that addresses the above mentioned issues is desirable in order to effectively bring renewable power generation into the base load power generation arena.

The present invention discloses apparatus and methods for thermal energy storage and retrieval by using a phase change material. The invention disclosed herein converts electrical energy, derived from an external energy source such as solar or wind energy, into thermal energy. The thermal energy is stored in the phase change material and later converted into mechanical/electrical energy by a thermal energy conversion system.

The disclosed apparatus comprises of a thermally conductive unit with one or more trenches for holding the phase change material, wherein the trench is configured to have a greater internal pressure withstanding capacity as compared with trenches having parallel walls or containers with cylindrical walls. In preferred embodiments, the conductive units are configured in such a manner to maximise the volume ratio of the phase change material to the conductive material.

BRIEF SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Exemplary embodiments of the present disclosure are directed towards thermally conductive units made of a thermally stable and thermally conductive material suitable for efficient transfer of thermal energy. The conductive unit comprises of a body having one or more of a trench for holding a phase change material. The trench is defined by one or more of a pair of opposing longitudinal walls and one or more of a pair of opposing side walls meeting at a base, the trench thereof having a predetermined shape and size, the trench thereof having a greater internal pressure withstanding capacity as compared with a trench defined by parallel walls or a container having cylindrical walls. In some embodiments, the conductive unit further comprises of a lid that substantially covers a top surface of the body. In preferred embodiments, the conductive units are configured in such a manner to maximise the volume ratio of the phase change material to the conductive material. In preferred embodiments, longitudinal and side walls are curved. In a preferred embodiment, the trench is partially elliptical in a planar cross section, the cross section thereof being perpendicular to a principle axis of the trench.

Exemplary embodiments of the present disclosure are directed towards methods for fabricating thermally conductive units. The method begins with providing one or more of blocks of thermally stable and thermally conductive material suitable for efficient transfer of thermal energy. The next step is machining one or more of a trench on the block, the trench thereof being defined by one or more of a pair of opposing longitudinal walls and one or more of a pair of opposing side walls meeting at a base. The trench has a predetermined shape and size. The trench is configured for holding a phase change material and for having a greater internal pressure withstanding capacity as compared with a trench defined by parallel walls or a container having cylindrical walls. The method further comprises of an optional step of securing the blocks together by either mechanical fasteners or suitable adhesives, wherein this optional step can be carried out either before or after machining the trench. The method further comprises another optional step to be used in the case of multiple blocks. The gaps between the blocks are sealed by a suitable sealant, the sealant being configured to prevent leakage of the molten phase change material. In preferred embodiments, the conductive units are configured in such a manner to maximise the volume ratio of the phase change material to the conductive material.

Exemplary embodiments of the present disclosure are directed towards thermal energy storage and retrieval apparatus. The apparatus comprises of one or more thermally conductive units as described in previous para, one of more energy sources for providing thermal energy to the phase change material, an inert gas system for providing and maintaining an inert atmosphere within the apparatus, one or more insulation layers and an outer enclosure member. In preferred embodiments, the conductive material of the conductive unit is sintered graphite and the phase change material is a silicon based composition exhibiting peritectoid transformations.

In a particular embodiment, the energy source comprises of one or more of heating elements that convert electrical energy from an external energy source into thermal energy by resistive heating thereby heating the conductive unit and/or the phase change material. In a particular embodiment, the energy source comprises of a microwave generator system. The microwave generator system is configured for converting electrical energy from an external energy source into microwaves thereby heating the conductive unit and/or the phase change material. In a particular embodiment, the energy source comprises of a plasma generation system that is configured for generating plasma from the inert gas by means of electrical energy from an external energy source. The plasma heats up the conductive unit and/or the phase change material.

The inert gas system comprises of an inert gas source for providing an inert gas, an inert gas supply unit that is connected with the inert gas source for supplying the inert gas from the inert gas source into the apparatus and a gas flow regulatory unit for regulating the flow of the inert gas into and out of the apparatus.

The insulation layers substantially enclose the conductive unit for minimising the loss of thermal energy from the apparatus.

The outer enclosure member substantially encompasses the insulation layer for maintaining an air-tight atmosphere within the apparatus and for providing structural integrity to the apparatus.

The apparatus is configured for storing and retrieving thermal energy by employing a phase change material. The apparatus is in thermal contact with one or more thermal energy conversion systems for the transfer of the thermal energy from within the conductive unit to the thermal energy conversion system, the thermal energy conversion system thereof converting the retrieved thermal energy into mechanical/electrical energy.

Exemplary embodiments of the present disclosure are directed towards methods for storing and retrieving thermal energy. The method begins by providing an apparatus as described from previous paras. The next step is providing thermal energy to the phase change material by means of the energy source. The thermal energy is absorbed by the phase change material on solid to liquid phase transition thereby storing the thermal energy. The stored thermal energy is extracted on liquid to solid phase transition of the phase change material. The released thermal energy gets transferred to the thermal energy conversion system via. the conductive unit. The extracted thermal energy is utilised by the thermal energy conversion system for conversion into mechanical/electrical energy.

It is an object of the present invention to disclose apparatus and methods for thermal energy storage and retrieval that efficiently harness different forms of energy.

It is yet another object of the present invention to disclose apparatus for thermal energy storage and retrieval that has greater internal pressure withstanding capacity due to phase transitions of the phase change material as compared with conventional apparatus.

It is yet another object of the present invention to disclose a conductive unit that is configured to maximise the volume ratio of the phase change material to the conductive material in some embodiments.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION

Figure 1A:
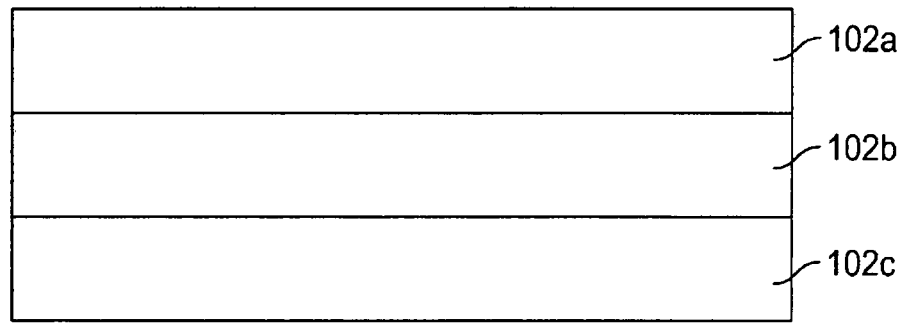
FIG. 1A is a simplistic representation of a configuration of multiple blocks, in accordance with a non limiting exemplary embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The present invention is directed towards apparatus and methods for thermal energy storage and retrieval by using a phase change material. The present invention further discloses thermally conductive units and methods thereof suitable for the above apparatus.

According to different non limiting exemplary embodiments of the present disclosure, thermally conductive units made of a thermally stable and thermally conductive material suitable for efficient transfer of thermal energy are disclosed. The conductive unit comprises of a body having one or more of a trench for holding a phase change material. The trench is defined by one or more of a pair of opposing longitudinal walls and one or more of a pair of opposing side walls meeting at a base, the trench thereof having a predetermined shape and size, the trench thereof having a greater internal pressure withstanding capacity as compared with a trench defined by parallel walls or a container having cylindrical walls. In some embodiments, the conductive unit further comprises of a lid that substantially covers a top surface of the body. The term "conductive unit" mentioned in this disclosure refers to either the body alone or the body with the lid without limiting the scope of the present disclosure. In preferred embodiments, the conductive units are configured in such a manner to maximise the volume ratio of the phase change material to the conductive material. In preferred embodiments, the longitudinal and side walls are curved. In a preferred embodiment, the trench is partially elliptical in a planar cross section, the cross section thereof being perpendicular to a major axis or a minor axis of the trench. In another embodiment, the trench has a substantially partially ellipsoidal shape.

In preferred embodiments, the conductive material of the conductive unit is sintered graphite and the phase change material is a silicon based composition exhibiting peritectoid transformations. The term "silicon" used herein with reference to the compositions of phase change material generally refers to silicon based compositions exhibiting peritectoid transformations.

In accordance with different non limiting exemplary embodiments of the present disclosure, methods for fabricating thermally conductive units are disclosed. The method begins with providing one or more blocks of thermally stable and thermally conductive material suitable for efficient transfer of thermal energy. The blocks can be either molded blocks or extruded blocks. The next step is forming at least a part of a trench on the block, the trench thereof having a predetermined shape and size. In some embodiments, blocks with one or more trenches formed during their manufacture may further be machined to achieve the desired geometry of the trench. The method further comprises of an optional step of securing the blocks together by either mechanical fasteners or suitable adhesives, wherein this optional step can be carried out either before or after machining the trench. The method further comprises another optional step to be used in the case of multiple blocks, wherein the gaps between the blocks are sealed by a suitable sealant, the sealant being configured to prevent leakage of the molten phase change material. In preferred embodiments, the conductive units are configured in such a manner to maximise the volume ratio of the phase change material to the conductive material.

In some embodiments, the blocks are molded with the desired shape of the trench thereby negating the step of machining the blocks to make a trench. In some embodiments, the conductive units of desired shapes are molded from a single block. In some embodiments, the conductive units are molded as separate blocks and simply secured together to get the desired shape.

The trenches are obtained by way of extrusion or by moulding the conductive unit to the desired shape of the trench and by further machining as required to achieve the elliptical shaped trench.

According to different non limiting exemplary embodiments of the present disclosure, thermal energy storage and retrieval apparatus are disclosed. The apparatus comprises of one or more thermally conductive units, one or more energy sources for providing thermal energy to the phase change material, an inert gas system for providing and maintaining an inert atmosphere within the apparatus, one or more insulation layers and an outer enclosure member.

In a particular embodiment, the energy source comprises of one or more heating elements that convert electrical energy from an external energy source into thermal energy by resistive heating thereby heating the conductive unit and/or the phase change material. In a particular embodiment, the energy source comprises of a microwave generator system. The microwave generator system is configured for converting electrical energy from an external energy source into microwaves thereby heating the conductive unit and/or the phase change material. In a particular embodiment, the energy source comprises of a plasma generation system that is configured for generating plasma from the inert gas by means of electrical energy from an external energy source. The plasma heats up the conductive unit and/or the phase change material.

The insulation layers substantially enclose the conductive unit for preventing/minimising the loss of thermal energy from the apparatus.

The outer enclosure member substantially encompasses the insulation layer for maintaining an air-tight atmosphere within the apparatus and for providing structural integrity to the apparatus.

The apparatus is configured for storing and retrieving thermal energy by employing a phase change material. The apparatus is in thermal contact with a thermal energy conversion system for transferring the retrieved thermal energy to the thermal energy conversion system, the thermal energy conversion system thereof converting the retrieved thermal energy into mechanical/electrical energy.

The thermally conductive units are made of highly thermally stable, thermally conductive material such as sintered graphite for efficient transfer of thermal energy. The conductive units are either made out of a single block of sintered graphite or multiple blocks of sintered graphite that are assembled together. Multiple blocks of graphite are preferred over single blocks for easy fabrication. In such embodiments where multiple blocks of graphite are utilised, two or more blocks are stacked side by side and/or one above another to achieve the desired dimensions of the thermally conductive units.

The stacked blocks may be secured with each other by mechanical fastening means, or thermal bonding with high temperature adhesives or both. In a preferred embodiment, nuts and bolts are used for securing the blocks together. Nuts are bolts can be made of tungsten carbide, carbon-carbon composite, graphite or any other suitable material known in the art that can withstand high temperatures of up to 1600° C. and that has a low coefficient of thermal expansion without limiting the scope of the present disclosure.

Multiple blocks though secured well enough might still have gaps in between that might cause leakage of the molten phase change material. To prevent such leakage, any glue based sealant or silicon-based eutectic paste that has a higher melting point than that of the phase change material are used in some embodiments. In embodiments that use silicon as the phase change material, the molten silicon that leaks into the gaps and/or pores of the trench upon initial melting reacts with the carbon in the sintered graphite conductive unit to form silicon carbide. Silicon carbide has a melting temperature of more than 2500° C. that is higher than the highest internal temperature reached in the apparatus thereby acting as a sealant that prevents further leakage of the silicon material. The silicon carbide formed upon the trench surface in these embodiments also serves as a thermal energy flow regulator where the thermal energy from the phase change material to the conductive unit is regulated due to the presence of the silicon carbide layer. In some embodiments, the thickness of the silicon carbide layers is only a few microns. The large surface area of the trench allows for the desired thermal energy to flow to the thermal energy conversion system. The thickness of the layer is governed by the concentration of silicon in the phase change material.

Figure 1B:
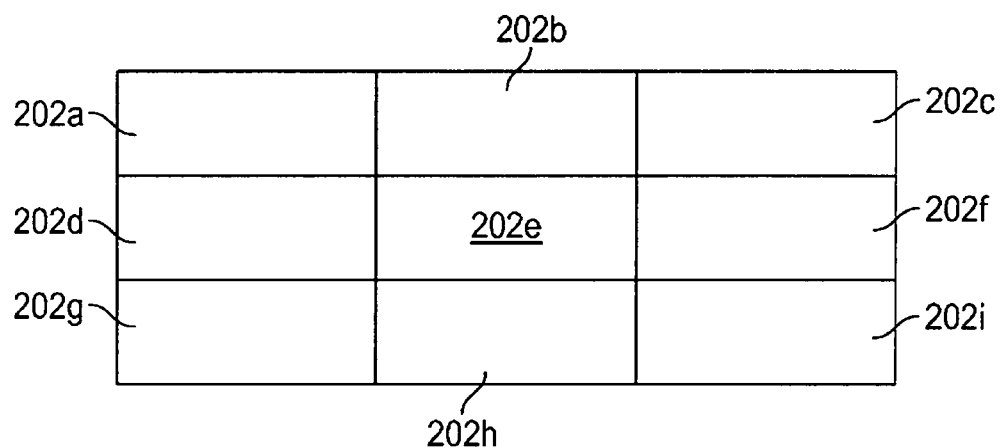
FIG. 1B is a simplistic representation of a configuration of multiple blocks, in accordance with another non limiting exemplary embodiment of the present disclosure.

Referring to FIGS. 1A and 1B, they depict the configuration of multiple blocks that are stacked together for fabricating a thermally conductive unit. In FIG. 1A, the blocks 102a to c are stacked one above another and in FIG. 1B, the blocks 202a to i are stacked one above another as well as side by side to form the desired dimensions of the conductive unit.

Figure 1C:
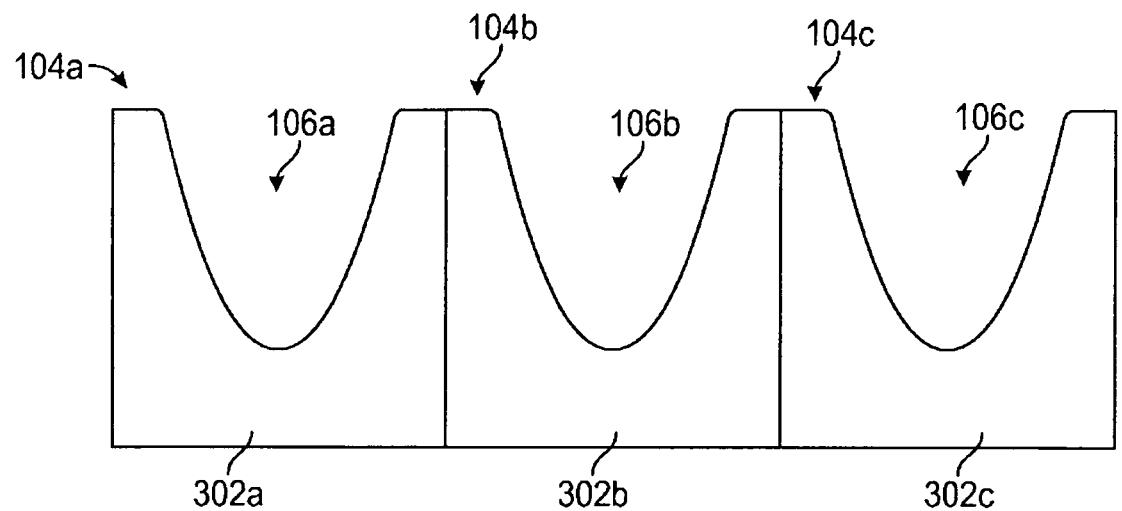
FIG. 1C is a simplistic representation of a cross section of thermally conductive units, in accordance with a non limiting exemplary embodiment of the present disclosure.
Figure 1D:
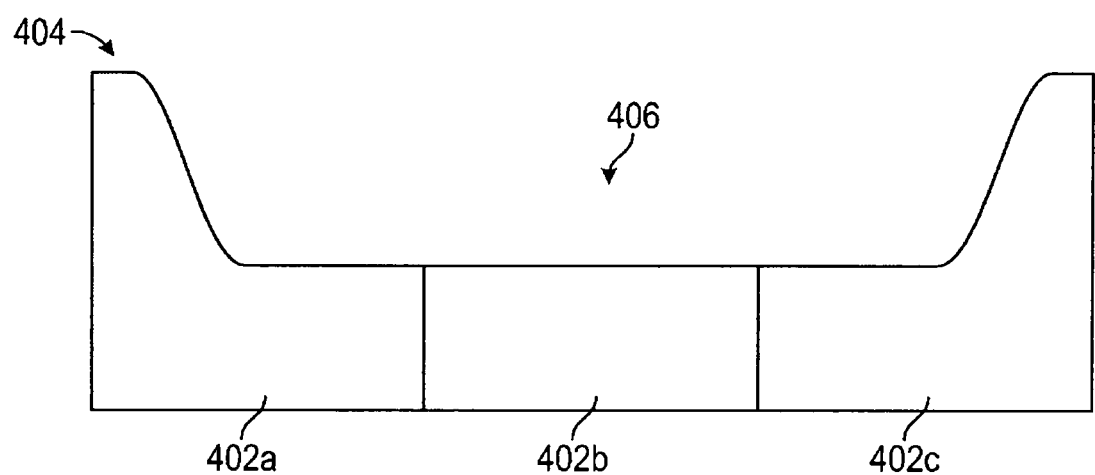
FIG. 1D is a simplistic representation of a longitudinal section of a thermally conductive unit, in accordance with a non limiting exemplary embodiment of the present disclosure.

Referring to FIG. 1C, it depicts a cross section of thermally conductive units 104 a, b and c having multiple blocks 302 a, b and c, wherein each of the block has a corresponding trench 106 a, b and c. Referring to FIG. 1D, it depicts a longitudinal section of a thermally conductive unit 404 having multiple blocks 402 a, b and c, wherein the substrate material is removed from the multiple blocks to create a single trench 406. In some embodiments, multiple trenches are defined within a single block of the conductive unit. The number and configuration of the blocks and the trenches in a conductive unit can vary without limiting the scope of the present disclosure.

The trench has two opposing longitudinal walls and two opposing side walls. In preferred embodiments, the longitudinal and side walls are curved. In some embodiments, the longitudinal and side walls are non-parallel. In some embodiments, the walls are sloped towards a base. In some embodiments, the upper portion of the trench has wider and longer dimensions than the lower portion of the trench. The two longitudinal walls are inclined at an angle to one another and meet at a base of the trench. The base of the trench is pointed, curved/rounded or substantially planar/flat. The preferred angle at which the two longitudinal walls meet at the base is about 50° to 110° depending on the size of the conductive unit. In some embodiments, the trenches have one or more circumferential grooves. The shape of the trench and circumferential grooves in the trench facilitate in controlling the pressure build up associated with the sublimation effect of the phase change material.

Figure 2A:
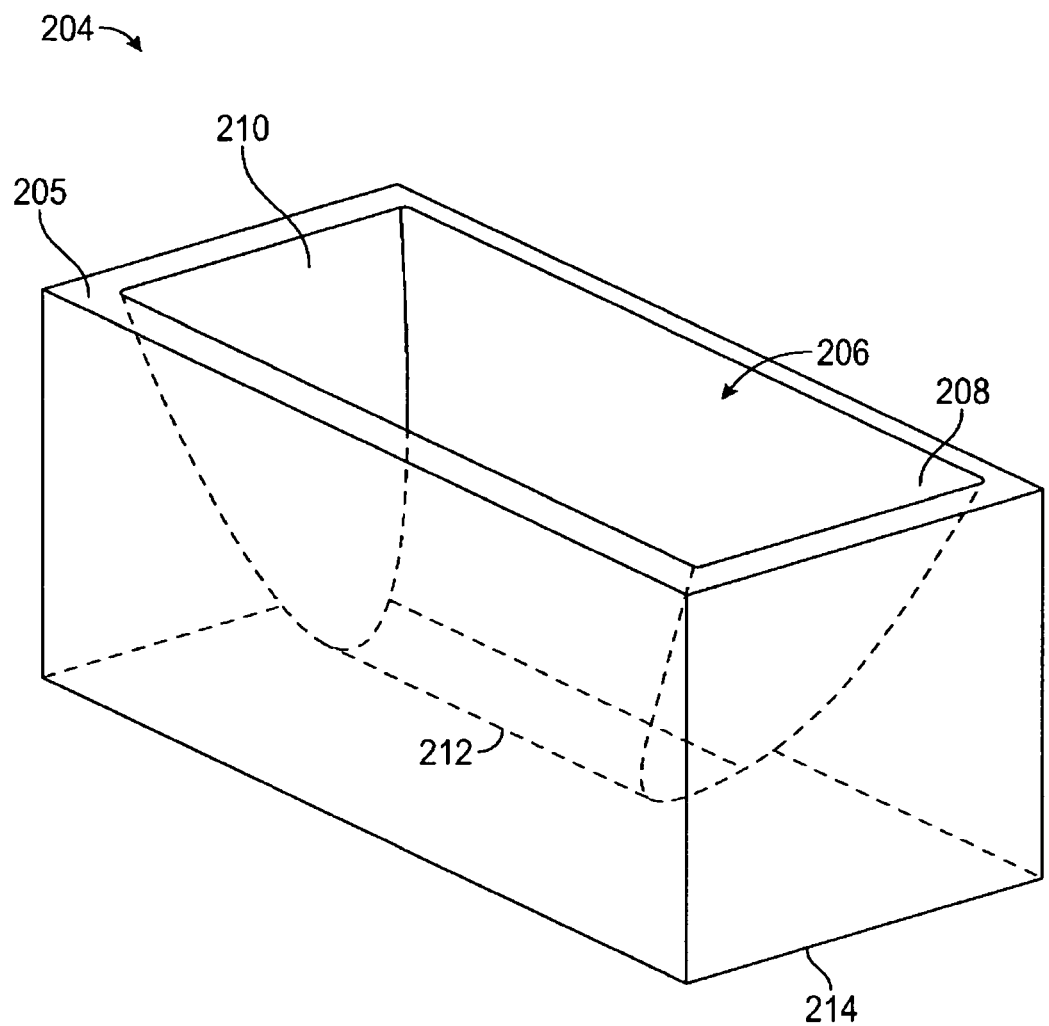
FIG. 2A is a simplistic representation of an isometric view of a thermally conductive unit showing a boat shaped trench, in accordance with a non limiting exemplary embodiment of the present disclosure.

Referring to FIG. 2A, it depicts a body 204 of a thermally conductive unit with a trench 206 for holding a phase change material. The trench 206 is boat shaped and has two opposing longitudinal walls 208 and two opposing side walls 210. The base 212 of the trench 206 does not touch the bottom 214 of the body 204 of the conductive unit. A top surface 205 of the body 204 is configured to be substantially covered by a lid (lid not shown in the figure) to prevent spillage of the phase change material and to prevent heat loss.

Figure 2B:
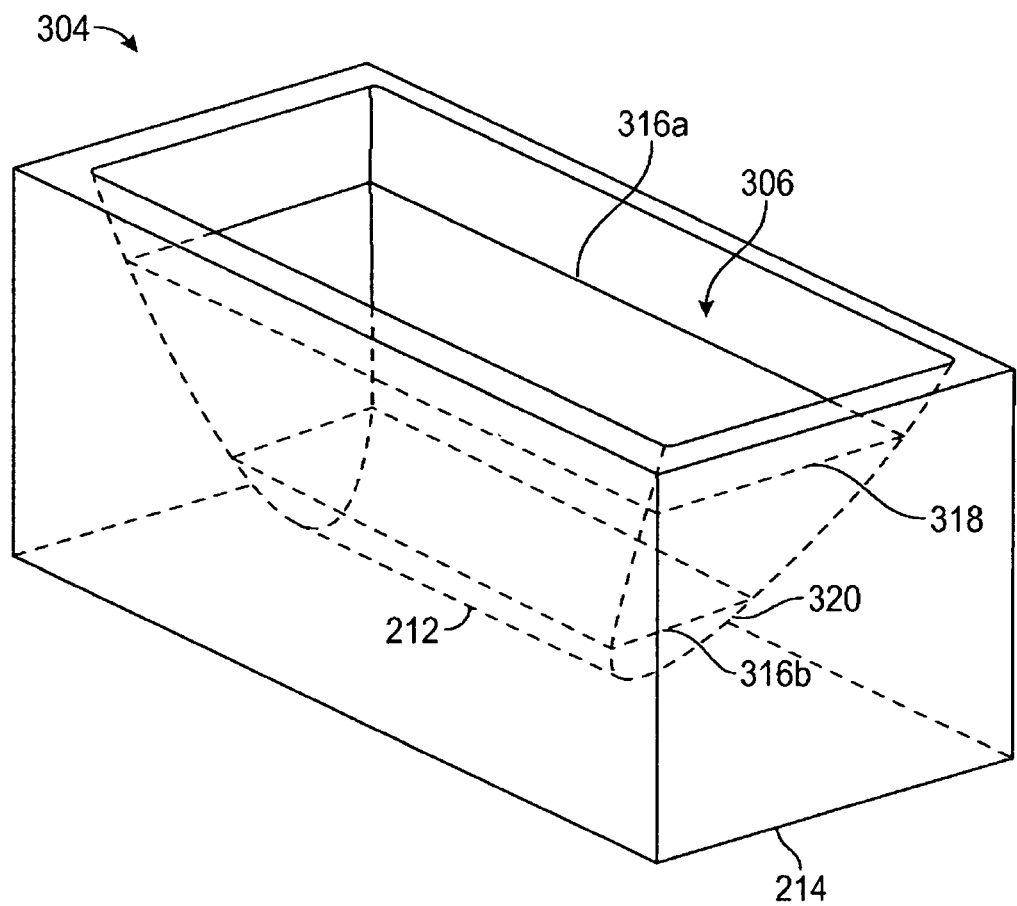
FIG. 2B is a simplistic representation of an isometric view of a thermally conductive unit with circumferential grooves, in accordance with another non limiting exemplary embodiment of the present disclosure.

Referring to FIG. 2B, it depicts a thermally conductive unit 304 with a boat shaped trench 306 for holding a phase change material. The trench has two circumferential grooves 316 a and b, one disposed in the upper portion 318 and another disposed in the lower portion 320 of the trench 306. The thermally conductive units can have one or more of the above mentioned circumferential grooves without limiting the scope of the present disclosure.

Figure 2C:
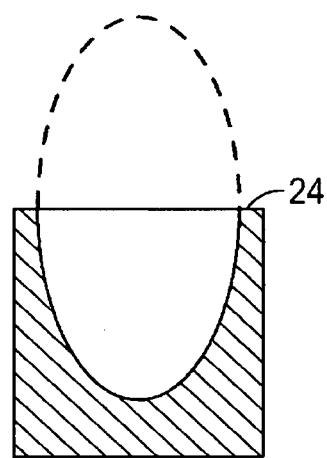
FIG. 2C is a simplistic representation of a cross sectional front view of a trench and FIG. 2D is a simplistic representation of a cross sectional side view of the trench, in accordance with a non limiting exemplary embodiment of the present disclosure.
Figure 2D:
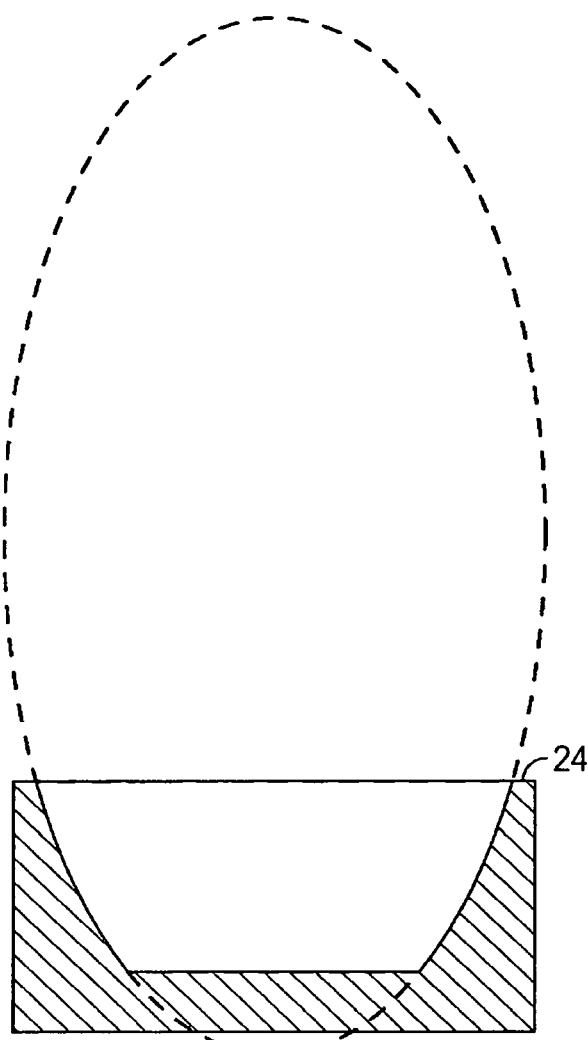

Referring to FIG. 2C, it depicts a cross sectional front view of a trench and referring to FIG. 2D, it is a cross sectional side view of the trench, in accordance with a non limiting exemplary embodiment of the present disclosure. These figures depict a significantly ellipsoidal trench in a conductive unit 24.

Multiple elliptical curved surfaces are obtained as a result of machining the conductive block to achieve the desired geometry of the trenches.

Figure 2E:
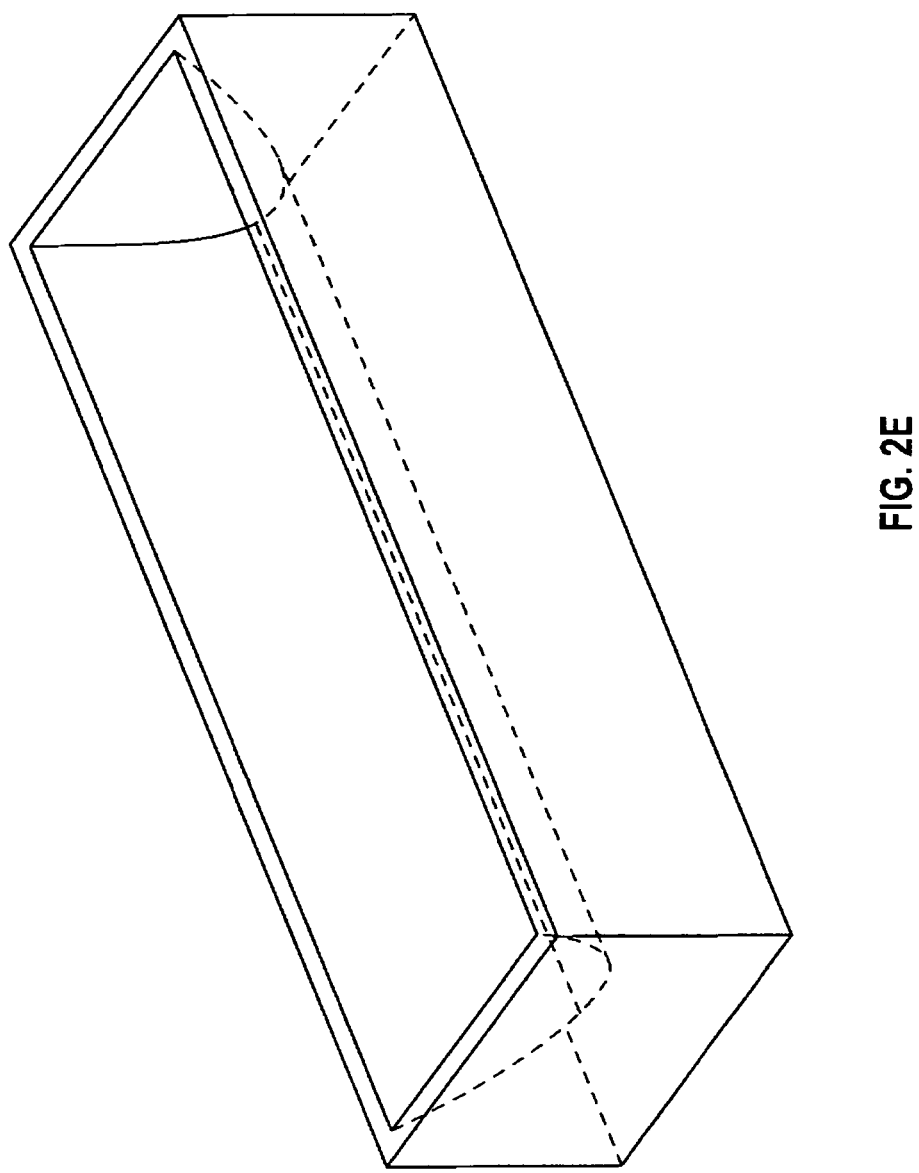
FIG. 2E is a simplistic representation of an isometric view of a thermally conductive unit, in accordance with yet another non limiting exemplary embodiment of the present disclosure.
Figure 2F:
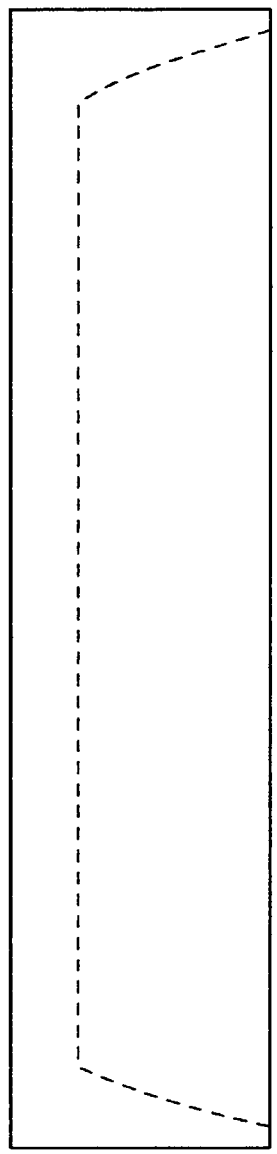
FIGS. 2F, 2G and 2H represent a side view, a top view and a front view respectively of the thermally conductive unit depicted in FIG. 2E.
Figure 2G:
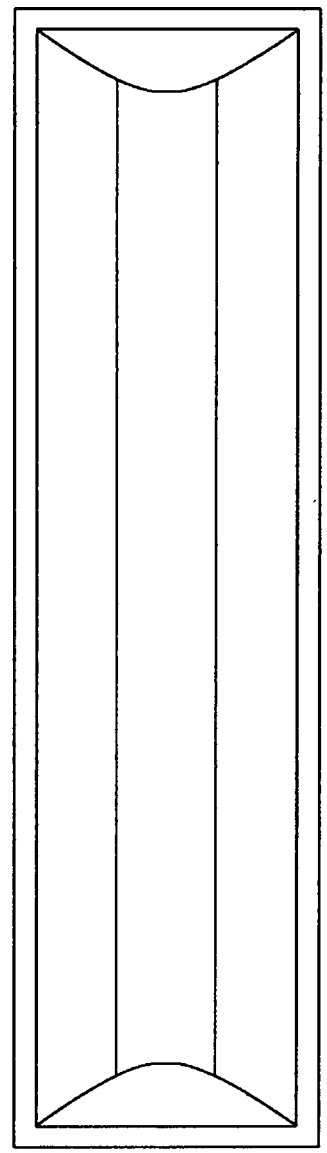
Figure 2H:
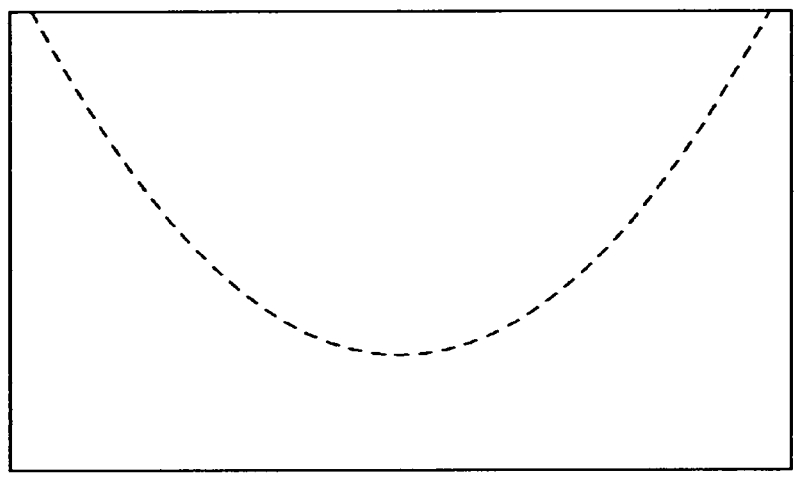

Referring to FIG. 2E, it depicts an isometric view of a thermally conductive unit, in accordance with yet another non limiting exemplary embodiment of the present disclosure. Different views of the conductive unit are depicted in FIGS. 2F, 2G and 2H.

The heating elements are ceramic heating elements, metal heating elements, sintered graphite heating elements or any other heating elements known in the art that can convert electrical energy into thermal energy by resistive heating without limiting the scope of the present disclosure. The external energy source is solar energy, wind energy or other forms of energy without limiting the scope of the present disclosure. The electric current that is supplied to the heating elements could be a DC current or an AC current. For example, the electric current could be a DC current from a photovoltaic array or an AC current from a wind turbine. The AC current or the DC current shall be suitably rectified to meet the requirements and specifications of the type of heating element that is used. The thermal energy that is generated from the heating element is either thermally coupled to the phase change material or is conducted through the thermally conductive unit to the phase change material. The heating elements are in thermal contact with the conducting unit and may be positioned either within the unit in recesses or adjacent/abutting the sides/top of the conducting units. The heating elements may be positioned in any orientation in the conductive unit i.e. horizontally, vertically or in any desired angle as may be appropriate to facilitate efficient transfer of thermal energy to the conductive unit. In preferred embodiments, the heating elements are not in direct physical contact with the phase change material but in some embodiments are disposed in lids above the trenches holding the phase change material in any appropriate orientation that facilitates efficient transfer of thermal energy directly to the phase change material.

The inert gas system of the apparatus is configured to provide and maintain an inert atmosphere within the apparatus given the high ambient temperatures within the apparatus and the combustible nature of graphite in the presence of oxygen. The inert atmosphere is provided by any one or a mixture of the following gases comprising nitrogen, argon, helium or carbon dioxide. Any other gas or gaseous mixture known in the art that can provide a non-reactive inert atmosphere and that can reduce free oxygen levels within the apparatus can be used without limiting the scope of the present disclosure. The term "inert gas" used hereafter in this disclosure refers to a single gas or to a gaseous mixture.

The inert gas system comprises of an inert gas source for providing an inert gas, an inert gas supply unit that is connected with the inert gas source for supplying the inert gas from the inert gas source into the apparatus and a gas flow regulatory unit for regulating the flow of the inert gas into and out of the apparatus. In some embodiments, the inert gas from the inert gas source is fed into an enclosed portion of the apparatus by the inert gas supply unit in a controlled manner to create an inert atmosphere in and around the conductive unit. The porous nature of the sintered graphite in the thermally conductive unit aids in the dispersion of the inert gas. In some embodiments, the sintered graphite heating elements are provided with one or more hollow channels to further facilitate in dispersion of the inert gas. In some embodiments, the inert gas system further comprises of an inert gas recycle unit for trapping the inert gas exiting from the apparatus and to resupply the trapped inert gas into the apparatus. In some embodiments, the inert gas recycle unit comprises of a flexible expansion chamber that is configured to capture and recycle the inert gas during charge and discharge cycles. Volume of expansion of the chamber is in proportion to the expanded volume of the hot inert gas. The inert gas source and the expansion chamber are placed outside the enclosed portion of the apparatus and are connected to the enclosed portion by pipes. The enclosed portion is made air tight to maintain the inert atmosphere by air-tight sealing means.

Figure 3:
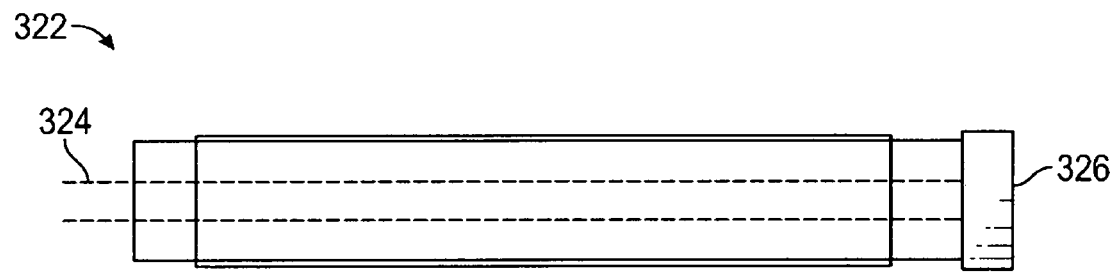
FIG. 3 is a schematic representation of a sintered graphite heating element, in accordance with non limiting exemplary embodiment of the present disclosure.

Referring to FIG. 3, it depicts a sintered graphite heating element 322 with a hollow channel 324 passing through the porous element 322. The channel 324 is adapted to feed the inert gas into the apparatus so as to create an inert atmosphere within the enclosed portion of the apparatus. A lower end of the heating element 322 is sealed by a beating element sealing member 326.

Figure 4:
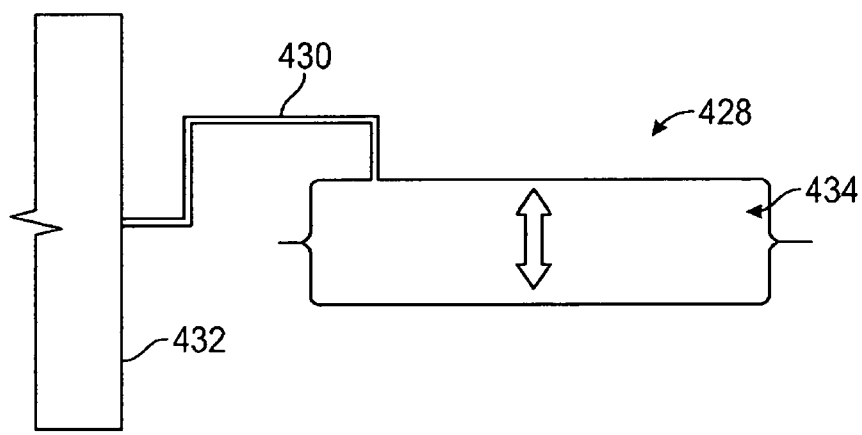
FIG. 4 is a schematic representation of a flexible expansion chamber connected to an energy storage and retrieval apparatus, in accordance with a non limiting exemplary embodiment of the present disclosure.

Referring to FIG. 4, it depicts a flexible expansion chamber 428 connected to an energy storage and retrieval apparatus 432 by an inert gas pipe 430. At high temperatures, the volume of the inert gas within the apparatus 432 expands almost thrice and the expanded gas is captured from the apparatus 432 by the expansion chamber 428 through the inert gas pipe 430. At lower temperatures, the volume of the gas within the apparatus 432 reduces and the inert gas 434 from the expansion chamber 428 gets recycled into the apparatus 432 through the inert gas pipe 430 due to the atmospheric pressure exerted on the flexible expansion chamber 428.

The internal temperature of the apparatus can reach in excess of 1600° C. The apparatus is provided with one or more insulation layers and an outer enclosure wall to prevent heat loss. Any insulation material known in the art that is non-hygroscopic and is capable of withstanding temperatures of at least 1600° C. can be used without limiting the scope of the present disclosure. Graphite is used as the hot face insulation material in some preferred embodiments.

The phase change material is a silicon based composition exhibiting peritectoid transformations. Any silicon based compositions that have negligible quantities of iron can be used as the phase change material without limiting the scope of the present disclosure though high purity silicon is most preferable.

The thermal energy stored in the phase change material is retrieved via the thermally conductive unit and transferred to heat engines and/or heat exchangers. In some embodiments, the heat receiving sections of heat engines are replaced with heat exchangers. Among heat engines, Stirling engine is preferred, though any other closed or open cycle heat engines can be used without limiting the scope of the present disclosure. The heat receiving sections/heat exchangers are connected with the conductive units in such a manner that facilitates maximum conduction/convection or infrared heat transfer to said heat engines and/or heat exchangers.

In some embodiments, the thermally conductive units are connected to one or more heat engines/heat exchangers either directly or through connector members, where the heat engines/heat exchangers convert the thermal energy that is retrieved into mechanical/electrical energy.

In some embodiments, the apparatus further comprises of a vibration reduction means for minimising transfer of vibrations of the heat engines to the thermally conductive unit. In a particular embodiment, a flexible annular silicon seal is used as a vibration reduction means. Other flexible materials known in the art that can withstand the high internal temperatures of the apparatus can be used for the seal without limiting the scope of the present disclosure. Any other vibration reduction means known in the art such as O-rings or bellows that can withstand the high internal temperatures of the apparatus can be used without limiting the scope of the present disclosure.

Figure 5:
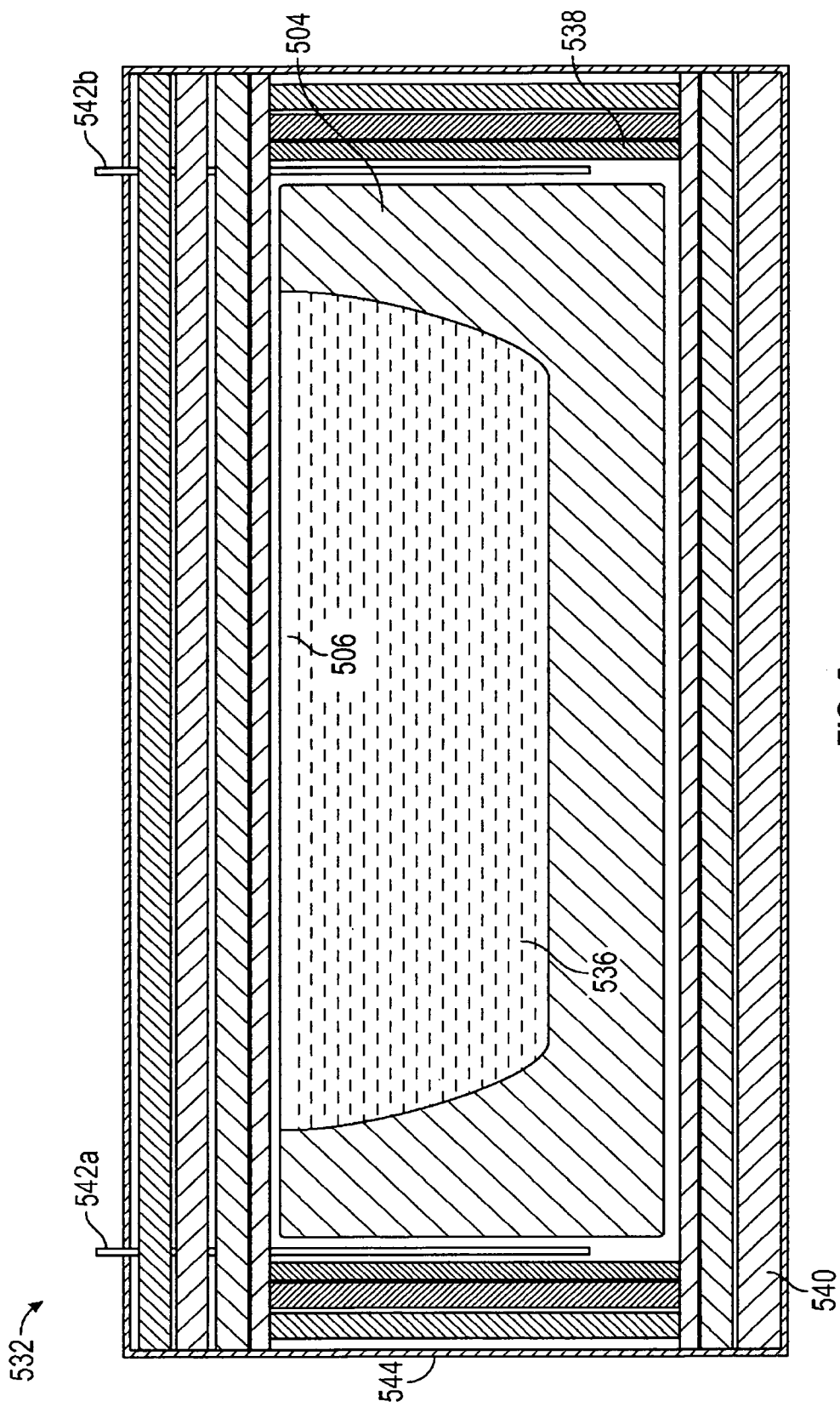
FIG. 5 is a schematic representation of a longitudinal section of an energy storage and retrieval apparatus, in accordance with a non limiting exemplary embodiment of the present disclosure.

Referring to FIG. 5, it depicts a longitudinal section of an energy storage and retrieval apparatus 532. The trench 506 of the thermally conductive unit 504 holds a silicon based composition exhibiting peritectoid transformations 536. The thermally conductive unit in this particular embodiment is fabricated from sintered graphite blocks. The apparatus 532 has ceramic heating elements 542 a and b that are disposed adjacent to the sides of the sintered graphite conductive unit. The conductive unit with the heating elements 542 is surrounded by a first layer of hot face insulation 538 followed by more layers of insulation 540 and completely enclosed by an enclosure member 544 in an air tight manner.

Figure 6A:
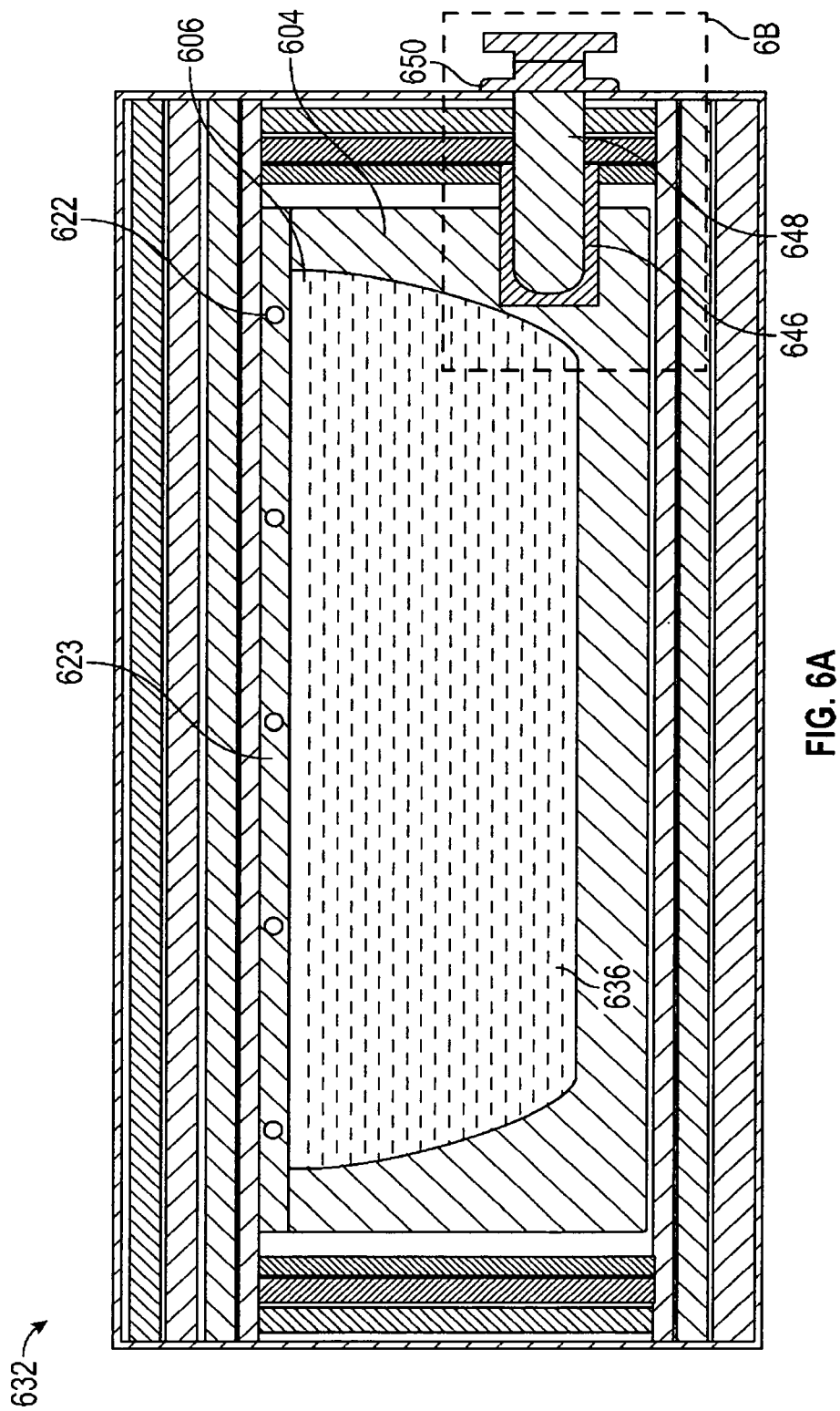
FIG. 6A is a schematic representation of a longitudinal section of an energy storage and retrieval apparatus, in accordance with another non limiting exemplary embodiment of the present disclosure.
Figure 6B:
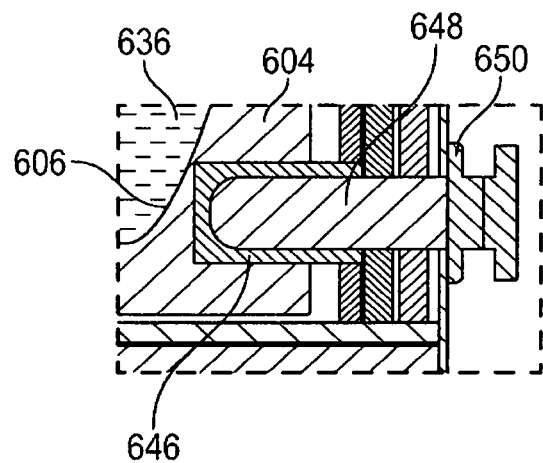
FIG. 6B is a schematic representation of a sectional view of a portion of the energy storage and retrieval apparatus of FIG. 6A showing the association of the connector member with the head of the Stirling engine.

Referring to FIGS. 6A and 6B, the energy storage and retrieval apparatus 632 has sintered graphite heating elements 622 that are horizontally disposed in the lid 623 above the mouth of the trench 606 holding silicon based composition exhibiting peritectoid transformations 636. The figures further depict a connector member 646 that connects a head of the Stirling engine 648 with the conductive unit 604. A flexible annular silicon seal 650 is employed as the vibration reduction means that is configured to reduce the transfer of vibrations from the Stirling engine to the conductive unit. The connector member 646 in this particular embodiment is a high grade sintered graphite with a higher heat transfer coefficient relative to the sintered graphite conductive unit 604. The high grade sintered graphite connector member 646 is in the form of a cylindrical tubular extension in this particular embodiment though any other form known in the art such as a graphite wick that would facilitate efficient heat transfer can be used without limiting the scope of the present disclosure. In this embodiment, the conductive unit is fabricated from low grade sintered graphite having a heat transfer coefficient of about 160 W/m²K and the connector member 646 is fabricated from high grade sintered graphite having a heat transfer coefficient of about 300 W/m²K. Using high grade sintered graphite for the whole conductive unit is not feasible considering the high cost of the material. The design of the apparatus as per this embodiment is economical and at the same time ensures efficient transfer of thermal energy to the heat engine.

Figure 7:
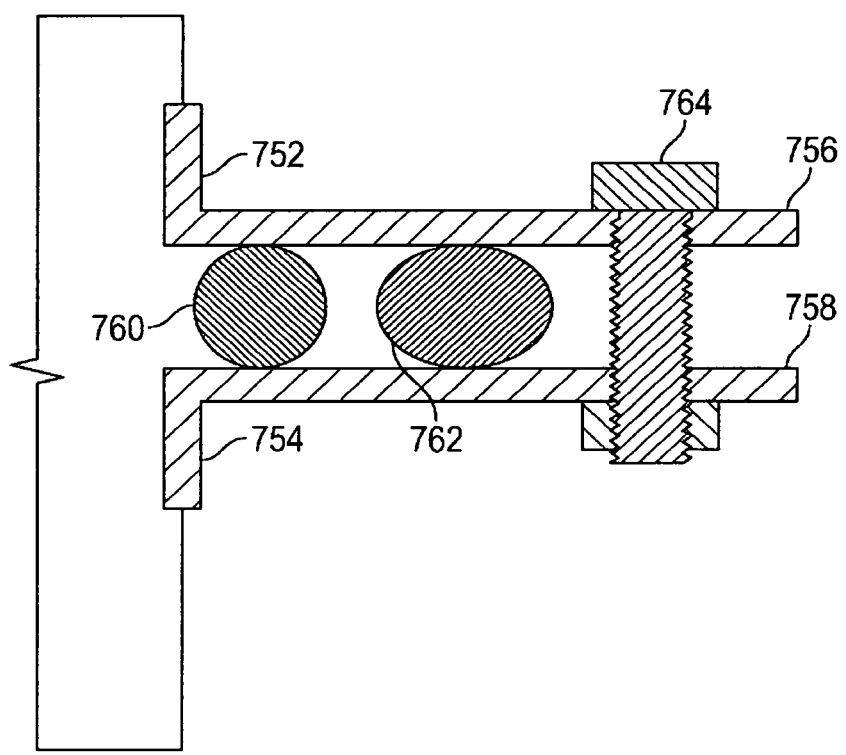
FIG. 7 is a schematic representation of a cross section of an air-tight sealing means present in the enclosure wall, in accordance with a non limiting exemplary embodiment of the present disclosure.

Referring to FIG. 7, it depicts a cross-sectional view of an air-tight sealing means present in the enclosure member/wall of the apparatus. In this particular embodiment, the enclosure wall of the apparatus has an upper lid member 752 with an upper flange 756 and a lower body member 754 with a lower flange 758. The upper and lower flanges 756 and 758 form an external projection around the wall. A steel spacer rod 760 and a compressed silicon seal 762 present in between the flanges, 756 and 758, around the outer edge of the enclosure wall form the air-tight sealing means of the apparatus. As can be seen from the figure, the flanges 756 and 758 are further secured by a plurality of nut-and-bolt fasteners 764.

The microwave generator system is configured for converting electrical energy from an external energy source into microwaves thereby heating the conductive unit and/or the phase change material. The microwaves impart energy into the inert gas that surrounds the conductive unit and hence the energy transfer is multidimensional with respect to the conductive unit. Essentially, the frequency of the microwave can be tuned to meet the heating requirements of the conductive unit directly. The same can be applied to directly heating the phase change material.

Figure 8A:
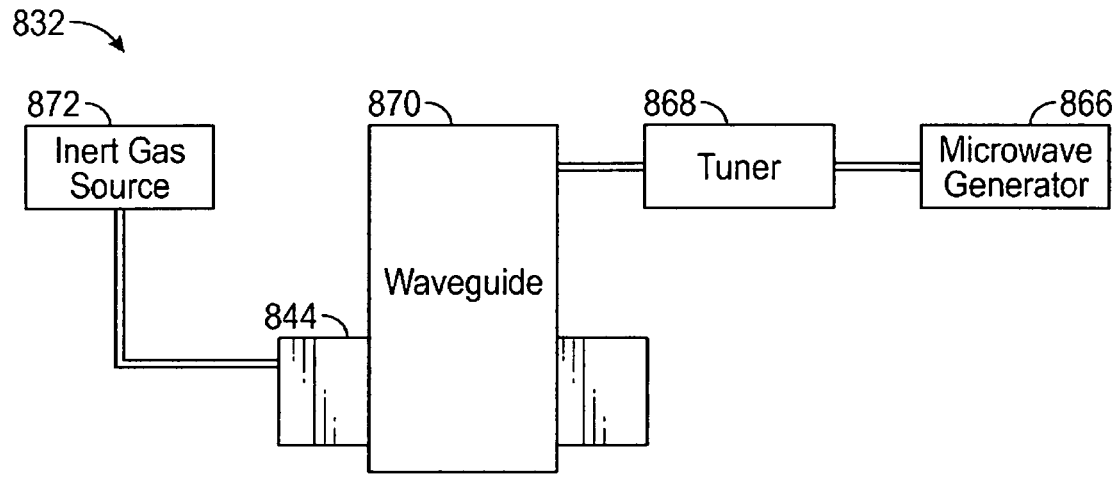
FIG. 8A is a schematic representation of an apparatus having a microwave generator system, in accordance with a non limiting exemplary embodiment of the present disclosure.

Referring to FIG. 8A, it depicts an apparatus 832 having a microwave generator system. In this embodiment, the inert gas from an inert gas source 872 is fed into the enclosed portion of the apparatus 844. The purpose of inert gas in this embodiment is only to prevent the combustion of the conductive block. The energy that is required to be stored is converted to microwaves by the microwave generator 866. The microwaves are transmitted through a wave guide 870 into the enclosed portion of the apparatus. The microwaves that are generated by a microwave generator 866 are tuned by a tuner 868 to heat either the conductive unit or the phase change material.

The microwaves if coupled to the inert gas present in the apparatus, converts the gas into plasma state. Such a state is then used for heating the phase change material either directly or through the conductive unit.

In a particular embodiment, the energy source comprises of a plasma generation system that is configured for generating plasma from the inert gas by means of imparting electrical energy from an external energy source. The plasma heats up the conductive unit and/or the phase change material. Plasma can be generated using the inert gas by using any method known in the art without limiting the scope of the present disclosure.

Figure 8B:
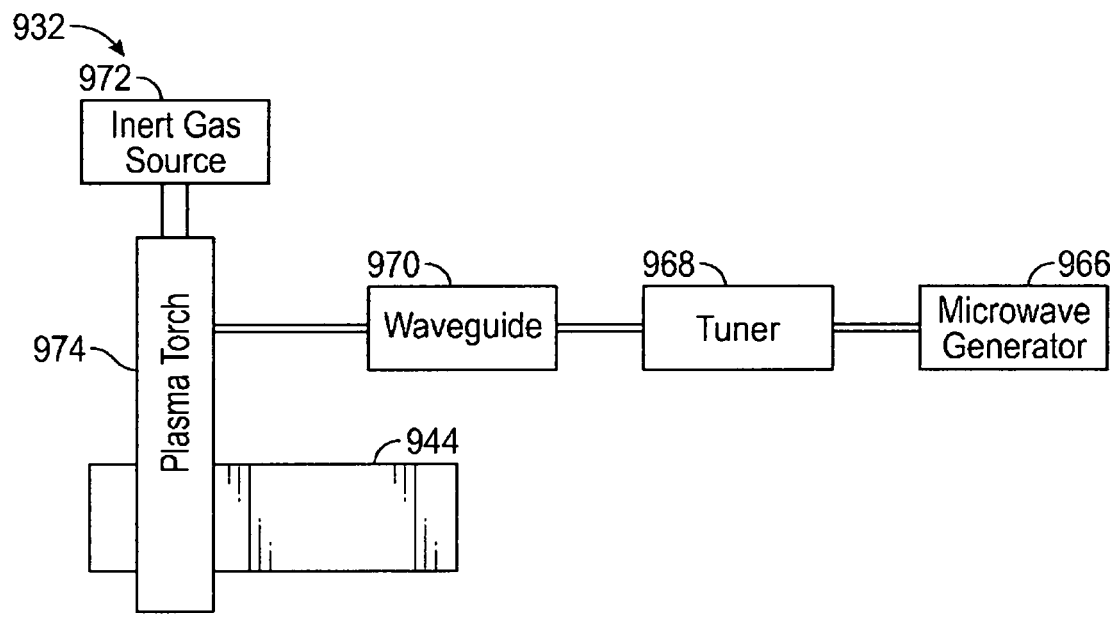
FIG. 8B is a schematic representation of an apparatus having a microwave based plasma generation system, in accordance with another non limiting exemplary embodiment of the present disclosure.

Referring to FIG. 8B, it depicts an apparatus 932 having a microwave based plasma generation system where the inert gas from an inert gas source 972 is converted into plasma before being fed or at the entry into the enclosed portion of the apparatus 944. As described in the previous embodiment, the microwaves that are generated by the microwave generator 966 are tuned by a tuner 968 and transmitted through a wave guide 970 into the plasma torch 974 for heating the inert gas and converting it into a plasma state before being fed through the enclosure wall of the apparatus.

In accordance with different non limiting exemplary embodiments of the present disclosure, methods for storing and retrieving thermal energy are disclosed. The method begins by providing the thermal energy storing and retrieving apparatus as described herein. The next step is providing thermal energy to the phase change material by means of the energy source. The thermal energy is absorbed by the phase change material on solid to liquid phase transition thereby storing the thermal energy. The stored thermal energy is retrieved from the phase change material, the phase change material thereof releasing the stored thermal energy on liquid to solid phase transition. The retrieved thermal energy gets transferred to one or more thermal energy conversion systems via. the conductive unit. In some embodiments, the transfer of the thermal energy from the conductive unit to the thermal energy conversion system happens through one or more connector members. The thermal energy conversion system comprises of one or more heat exchangers and/or heat engines operatively connected to generators. The retrieved thermal energy is utilised by the thermal energy conversion system for conversion into mechanical/electrical energy.

Example

Figure 9A:
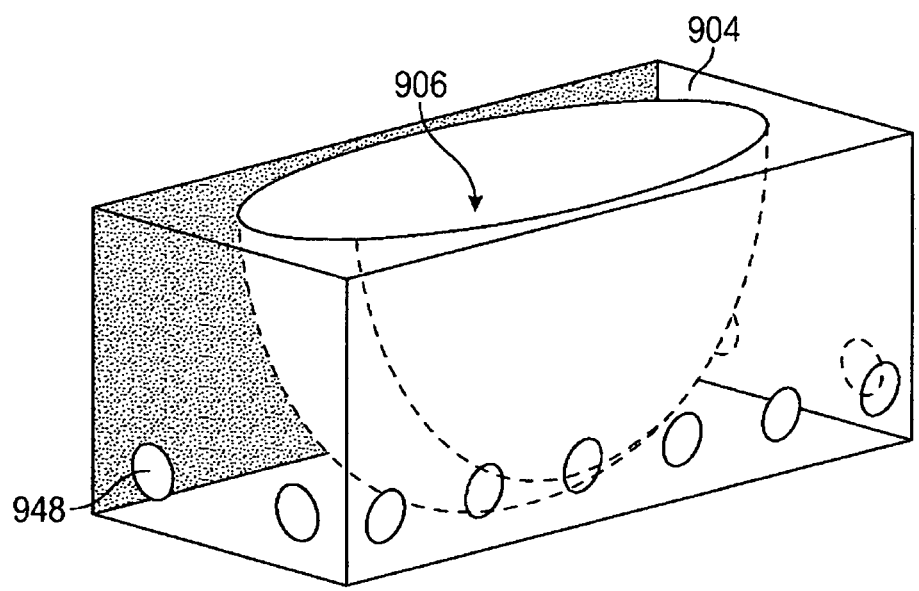
FIG. 9A is a simplistic representation of an isometric view of a thermally conductive unit with an ellipsoid-type trench, in accordance with a non limiting exemplary embodiment of the present disclosure.
Figure 9B:
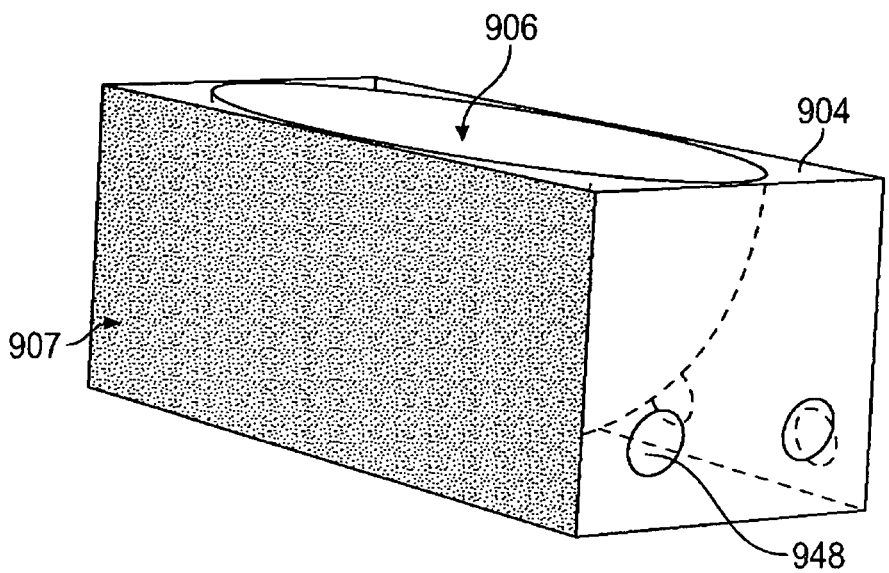
FIG. 9B is a simplistic representation of another isometric view of the conductive unit shown in FIG. 9A depicting the inlet heat boundary.
Figure 9C:
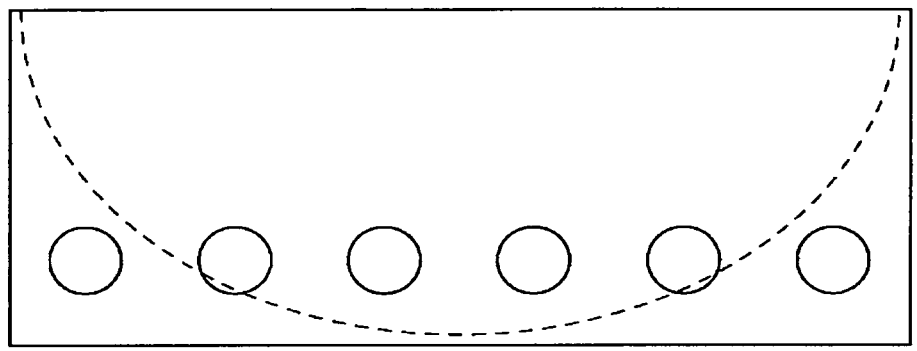
FIGS. 9C, 9D and 9E represent a side view, a top view and a front view respectively of the thermally conductive unit depicted in FIG. 9A.
Figure 9D:
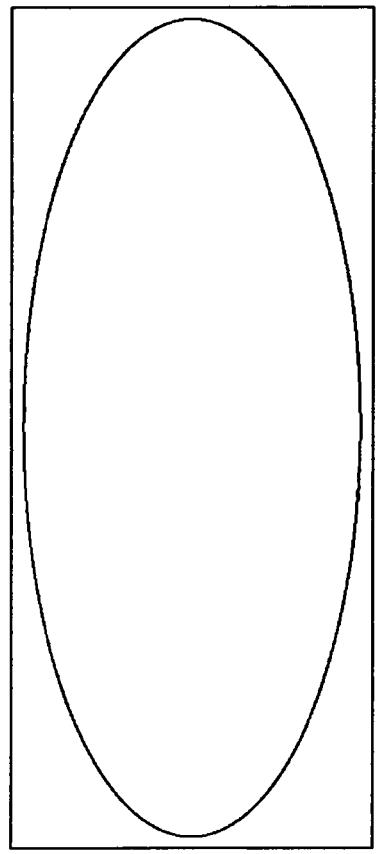
Figure 9E:
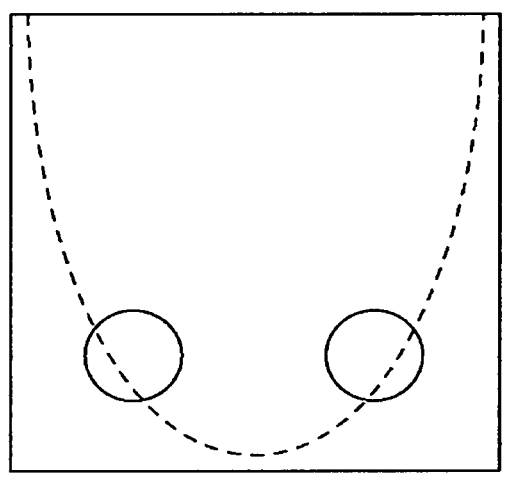

3D Computerized Modeling of Heat Transfer and Solid Mechanics in an Ellipsoid-Type Conductive Unit Referring to FIGS. 9A and 9B, a thermally conductive unit 904 having an (partial) ellipsoid-type trench 906 with silicon, including an inlet heat source 907 and Outlet heat consuming members 948 viz. ten Stirling engines are used for this 3D model of thermal analysis. Referring to FIGS. 9C, 9D and 9E, they represent different views of the conductive unit used in this model. The heat transfer module of COMSOL Multiphysics simulation software is used for this modeling. In addition to thermal analysis, a stress/strain analysis is also carried out.

Figure 10A:
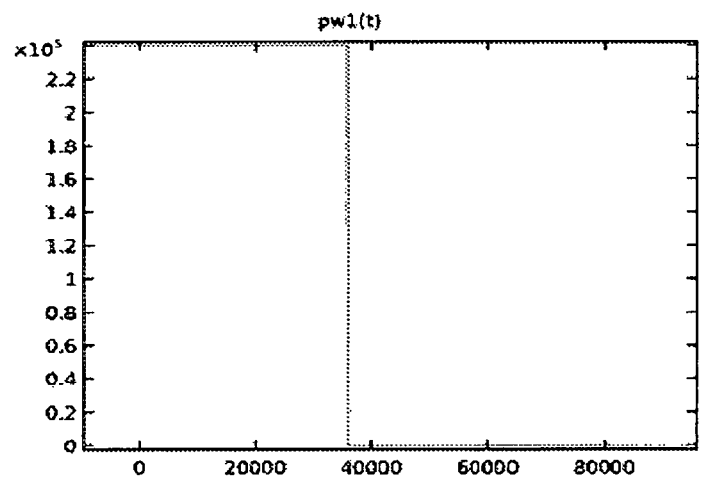
FIGS. 10A and 10B depict the inlet and outlet heat regimes respectively, for the conductive unit depicted in FIG. 9A.
Figure 10B:
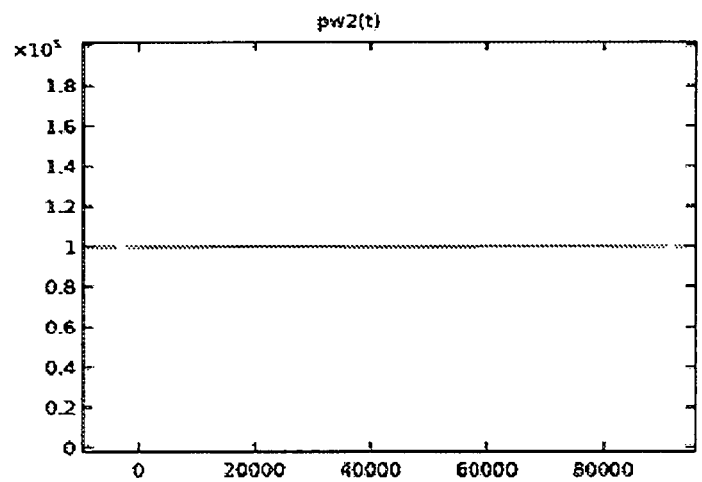

Heat Transfer in Solids:

Heat enters the conductive unit 904 from the inlet heat source boundary, diffuses through graphite and silicon domains and exits from where ten Stirling engines are located. This model deals with 10 hours inlet heat and 24 hours outlet heat from the conductive unit 904. The FIG. 9B depicts the inlet heat source boundary 907. At this boundary, inlet heat equals to conduction. Tables 1 and 2 deal with inlet heat source boundary conditions and FIG. 10A depicts an inlet heat regime. Tables 3 and 4 deal with the boundary conditions of the heat exiting from the heat engines and FIG. 10B depicts an outlet heat regime.

TABLE 1

| Inlet heat boundary conditions | | |
|---|---|---|
| Property | Value | Unit |
| Surface area | 2.5 | m² |
| Inlet heat | 1200 | kW · h |

TABLE 2

Inlet heat regime

| From (second) | To (second) | Value | Unit |
|---|---|---|---|
| 0 | 10 * 3600 = 36000 | 240000 | kW · h |
| 36000 | 24 * 3600 = 86400 | 0 | kW · h |

TABLE 3

Outlet heat boundary conditions

| Property | Value | Unit |
|---|---|---|
| Surface area | 10 * π * 0.1$^2$ | m$^2$ |
| outlet heat | 1200 | kW · h |

TABLE 4

Outlet heat regime

| From (second) | To (second) | Value | Unit |
|---|---|---|---|
| 0 | 10 * 3600 = 36000 | 100000 | kW · h |
| 36000 | 24 * 3600 = 86400 | 100000 | kW · h |

Except for inlet and outlet boundaries, the rest of the unit is considered to be covered by a thermal insulation on which the conduction equals to zero.

Heat Transfer with PCM:

For silicon which is considered as the PCM in this study, a parameter of θ represents the phase change ratio, which evaluates between 1, for Solid and 0, for Liquid. The physical properties of PCM are evaluated dynamically according to the following equations:

$$\rho C_p \frac{\partial T}{\partial t} + \rho C_p u \cdot \nabla T = \nabla \cdot (K \nabla T) + Q + Q_{vh} + Wp$$

$$K = \theta k_{phase1} + (1 - \theta) k_{phase2}$$

$$C_p = \theta C_{p\text{-}phase1} + (1 - \theta) C_{p\text{-}phase2} L \frac{d\alpha}{dT}$$

$$\rho = \frac{\theta \rho phase1 C_p \cdot phase1 + (1 - \theta) \rho phase2 C_p \cdot phase2}{\theta C_p \cdot phase1 + (1 - \theta) C_p \cdot phase2}$$

Initial Temperature

The initial temperature at the beginning of calculation is assumed as 923.15K (650° C.), all through the conductive unit.

Solid Mechanics

Because a part of the modeling target is to investigate Thermal stress and Thermal strain, a module of solid Mechanics is incorporated in this model. For this purpose, both graphite and silicon are considered as Linear Elastic materials. Table 5 includes those thermomechanical properties required for this modeling.

TABLE 5

| | Property | Name | Value | Unit |
|---|---|---|---|---|
| Silicon | Coefficient of thermal expansion | α | 2.6e−6 | 1/K |
| | Young's modulus | E | 170e9 | Pa |
| | Poisson's ratio | nu | 0.28 | 1 |

TABLE 5-continued

| | Property | Name | Value | Unit |
|---|---|---|---|---|
| Graphite | Coefficient of thermal expansion | α | 9e−6 | 1/K |
| | Young's modulus | E | 11.879 | Pa |
| | Poisson's ratio | nu | 0.265 | 1 |

Fixed Constraints

In this model all the external faces (except the top surface of the conductive unit) and all the interfaces between Graphite and Silicon are assumed as fixed constraints.

Mesh

Figure 11:
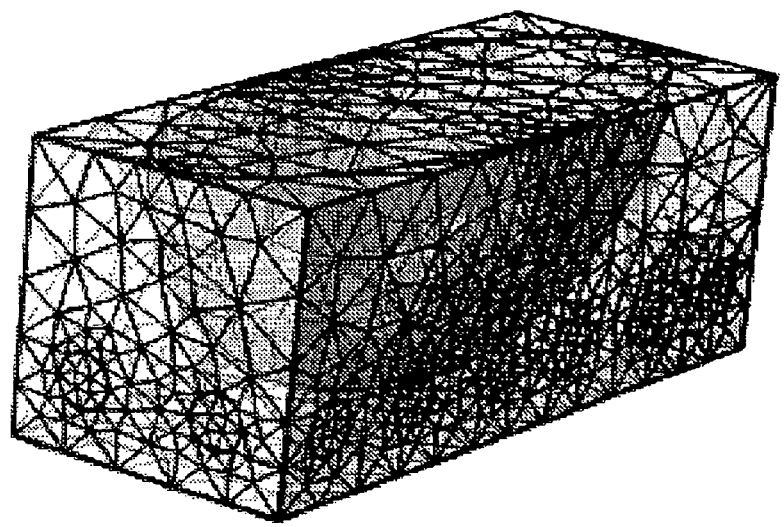
FIG. 11 depicts the mesh distribution through the conductive unit depicted in FIG. 9A.

Before starting the calculation, it is essential to select an optimised mesh distribution for different domains of geometry. For this study, a coarse mesh size for the Silicon and the Graphite domain are considered. FIG. 11 illustrates the mesh distribution through the conductive unit.

Computational Study

A huge time dependent finite difference together with finite element method of calculation, nonlinearly are conducted over the entire geometry through the optimised mesh. Time sequences for the calculation are considered as below:

Times: range (0,60,86400)

This means from time zero to 24 hours data are recorded in 60-second intervals.

The modeling restricts with 5% relative tolerances.

Results and Discussion

Phase Change

The outcome of the modeling predicts a phase change in Silicon domain. The results showed that with this very high input heat, the silicon phase converts quickly into liquid phase after a minute.

Temperature Profile

Figure 12:
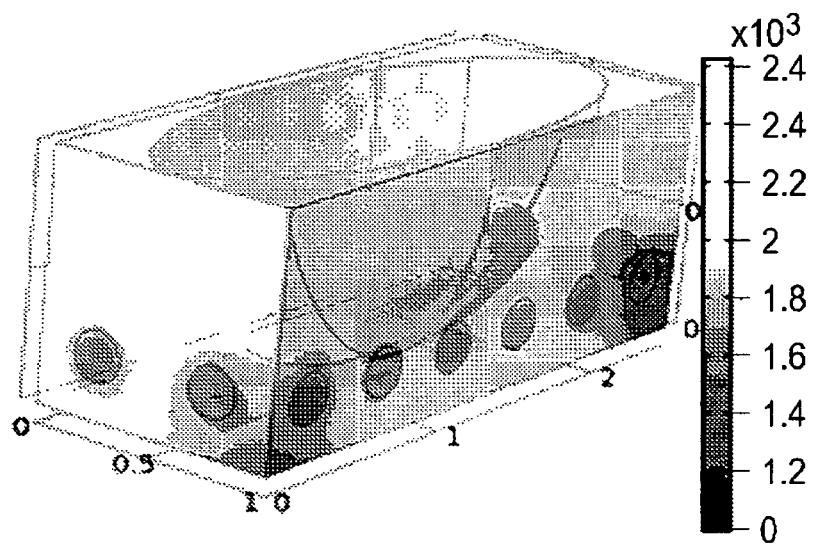
FIG. 12 depicts the temperature profile of the conductive unit surface shown in FIG. 9A. Time=84540 s Surface: Temperature (K)

The outcome of the modeling shows bow the temperature profile through the conductive unit changes as time elapses. As an instance, after 24 hours, a temperature profile of the conductive unit surface is illustrated as in FIG. 12. At that time the maximum and the minimum temperature along the conductive unit are 1000K and 600K which are on inlet heat and at the Stirling engines' tips respectively.

Isothermal Contours

Figure 13:
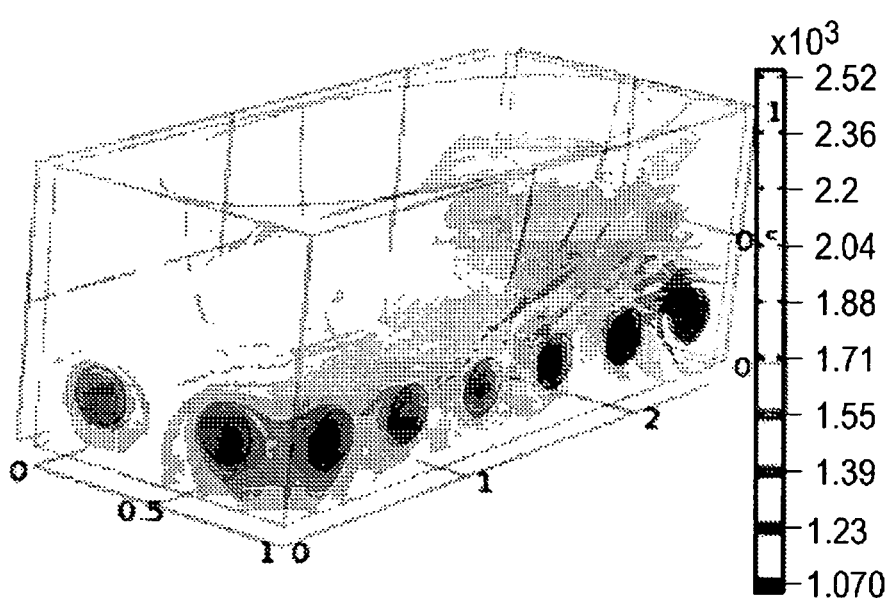
FIG. 13 depicts the isothermal contours faces through the conductive unit depicted in FIG. 9A. Time+85560 s Isosurface: Temperature (K)

Isothermal Contours faces through the conductive unit are shown in FIG. 13. As it is reflected in this figure, after 24 hours, temperature gradient increases next to the Stirling engines as the heat is consumed by them.

Stress (in Solid State)

Figure 14:
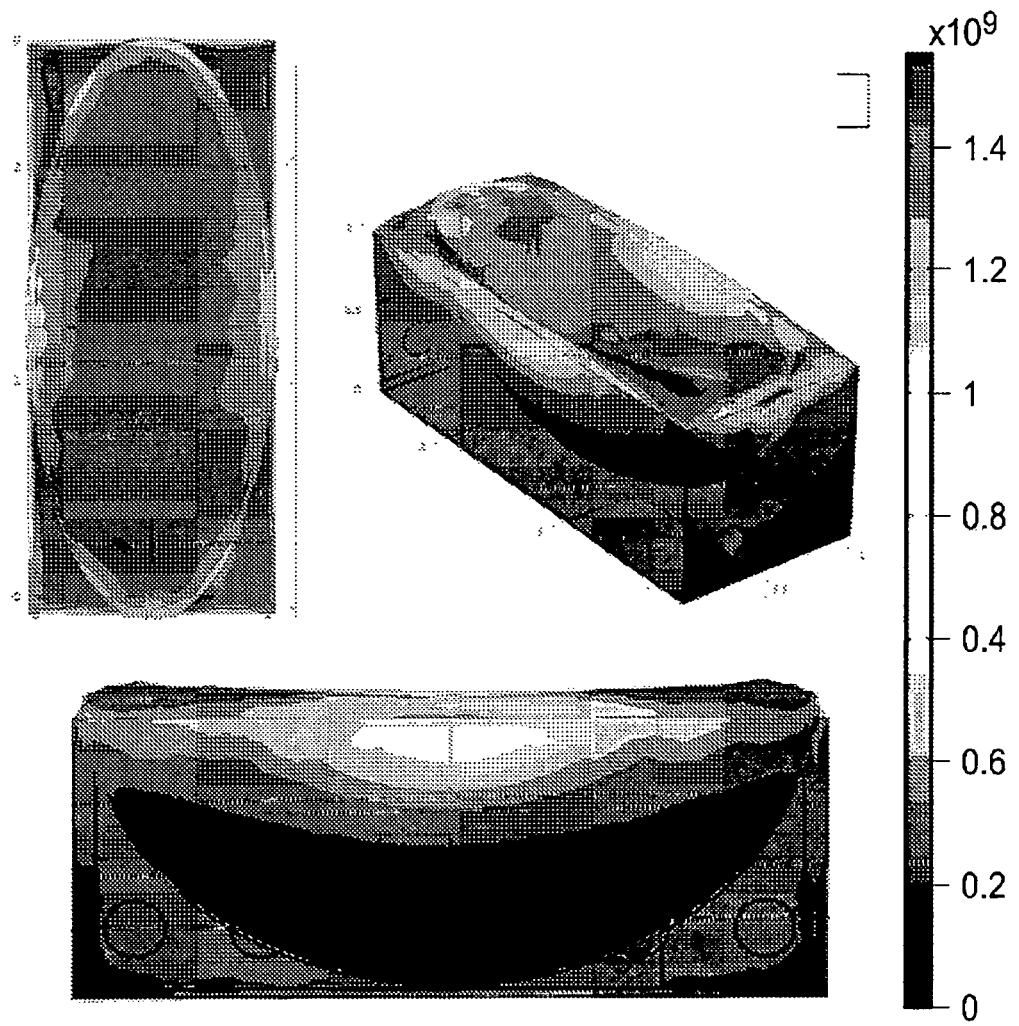
FIG. 14 depicts the maximum stress (Pa) on the surfaces of the conductive unit shown in FIG. 9A in different views. Time=60 s Surface: von Mises stress (Pa)

FIG. 14 shows different views of the conductive unit and the stress generated after 60" when the silicon solid is about to be melted. This figure clearly shows that although the maximum stress in the system exceeds than 1.4 GPa, the maximum stress generated on interfaces of Graphite and Silicon reaches to the average of 355 MPa.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

I claim:

1. A thermal energy storage and retrieval apparatus comprising:
   a) a thermally conductive unit comprising a body having a trench for holding a phase change material, the trench thereof being defined by a pair of opposing longitudinal walls and a pair of opposing side walls meeting at a base, the trench thereof having a boat shape the base of the boat shaped trench does not touch the bottom of the body of the conductive unit, the conductive unit thereof being made of a thermally stable and thermally conductive material suitable for efficient transfer of thermal energy;
   b) an energy source for providing thermal energy to the phase change material, whereby the phase change material comprises of a silicon based composition exhibiting peritectoid transformations;
   c) an inert gas system for providing and maintaining inert atmosphere within the apparatus, the inert gas system thereof comprising an inert gas source for providing an inert gas into the apparatus, a heating element made of sintered graphite, the heating element thereof comprising a cylindrical coaxial porous channel aligned within the heating element the cylindrical coaxial porous channel thereof being configured for feeding the inert gas into the apparatus from the inert gas source for generating inert atmosphere within the apparatus;
   d) a tubular connector member made of high grade sintered graphite, the tubular connector member thereof having a heat transfer coefficient associated therewith, the heat transfer coefficient thereof being greater than a heat transfer coefficient of the conductive material, the tubular connector member thereof facilitating efficient thermal transfer from the conductive unit to a thermal energy conversion system, the conductive unit is fabricated from sintered graphite blocks, a retrieval apparatus has ceramic heating elements that are disposed adjacent to sides of a sintered graphite conductive unit, the conductive unit with the ceramic heating elements is surrounded by a first layer of hot face insulation followed by more layers of insulation and completely enclosed by an enclosure member in an air tight manner.

2. The apparatus of claim 1, wherein the conductive unit further comprises of a lid covering a top surface of the body to prevent spillage of the phase change material and to prevent heat loss.

3. The apparatus of claim 1, wherein the conductive unit having a boat shaped trench is configured to maximise a volume ratio of the phase change material to the conductive material.

4. The apparatus of claim 1, wherein the longitudinal walls and the side walls are curved.

5. The apparatus of claim 4, wherein the boat shaped trench is elliptical in a planar cross section, the planar cross section thereof being perpendicular to a major axis or a minor axis of the boat shaped trench.

6. The apparatus of claim 1, wherein the boat shaped trench comprises of a circumferential groove for controlling the pressure build-up associated with a phase transition of the phase change material.

7. The apparatus of claim 1, wherein the energy source comprises of a microwave based plasma generation system being configured to generate microwaves are tuned by a tuner and transmit through a wave guide into a plasma torch for heating the inert gas and converting the inert gas into a plasma, the plasma thereof heating the conductive unit or the phase change material.

8. The apparatus of claim 1, wherein the inert gas system comprises of a flexible expansion chamber configured to capture and recycle the inert gas during charging and discharging cycles, volume of expansion of the flexible expansion chamber is in proportion to the expanded volume of the hot inert gas.

9. A method for storing and retrieving thermal energy comprising:
   a) providing a thermal energy storage and retrieval apparatus comprising of:
      i) a thermally conductive unit comprising a body having a trench for holding a phase change material, the trench thereof being defined by a pair of opposing longitudinal walls and a pair of opposing side walls meeting at a base, the trench thereof having a boat shape, the base of the boat shaped trench does not touch the bottom of the body of the conductive unit, the conductive unit thereof being made of a thermally stable and thermally conductive material suitable for efficient transfer of thermal energy;
      ii) an energy source for providing thermal energy to the phase change material, whereby the phase change material comprises of a silicon based composition exhibiting peritectoid transformations;
      iii) an inert gas system for providing and maintaining inert atmosphere within the apparatus, the inert gas system thereof comprising an inert gas source for providing an inert gas, a heating element made of sintered graphite, the heating element thereof comprising a cylindrical coaxial porous channel aligned within the heating element, the cylindrical coaxial porous channel thereof being configured for feeding the inert gas into the apparatus from the inert gas source for generating inert atmosphere within the apparatus; and
      iv) a tubular connector member made of high grade sintered graphite, the tubular connector member thereof having a heat transfer coefficient associated therewith, the heat transfer coefficient thereof being greater than a heat transfer coefficient of the conductive material, the tubular connector member thereof facilitating efficient thermal transfer from the conductive unit to a thermal energy conversion system;
   b) providing thermal energy to the phase change material by the energy source; and
   c) the conductive unit is fabricated from sintered graphite blocks, a retrieval apparatus has ceramic heating elements that are disposed adjacent to sides of a sintered graphite conductive unit, the conductive unit with the ceramic heating elements is surrounded by a first layer of hot face insulation followed by more layers of insulation and completely enclosed by an enclosure member in an air tight manner.

10. The method of claim 9, wherein the conductive unit comprises of a lid covering a top surface of the body to prevent spillage of the phase change material and to prevent heat loss.

11. The method of claim 9, wherein the conductive unit having a boat shaped trench is configured to maximise a volume ratio of the phase change material to the conductive material.

12. The method of claim 9, wherein the longitudinal walls and the side walls are curved.

13. The method of claim 12, wherein the boat shaped trench is elliptical in a planar cross section, the planar cross section thereof being perpendicular to a major axis or a minor axis of the boat shaped trench.

14. The method of claim 9, wherein the boat shaped trench comprises of a circumferential groove for controlling the pressure build-up associated with a phase transition of the phase change material.

15. The method of claim 9, wherein the energy source comprises of a microwave based plasma generation system being configured to generate microwaves are tuned by a tuner and transmit through a wave guide into a plasma torch for heating the inert gas and converting it into a plasma, the plasma thereof heating the conductive unit or the phase change material.

16. The method of claim 9, wherein the inert gas system comprises of a flexible expansion chamber configured to capture and recycle the inert gas during charging and discharging cycles, volume of expansion of the flexible expansion chamber is proportion to the expanded volume of the hot inert gas.

* * * * *